United States Patent Office
3,057,329
Patented Oct. 9, 1962

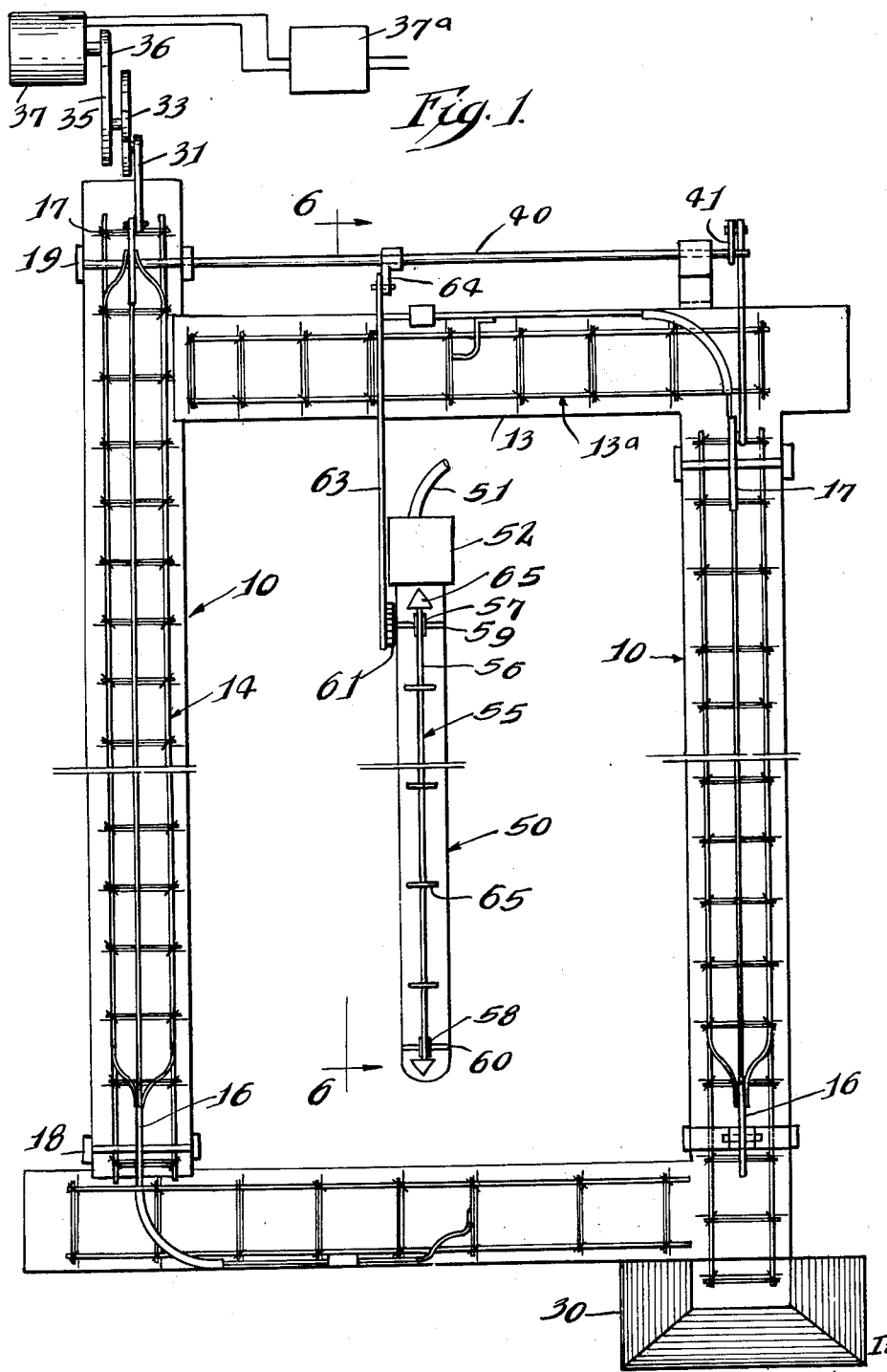

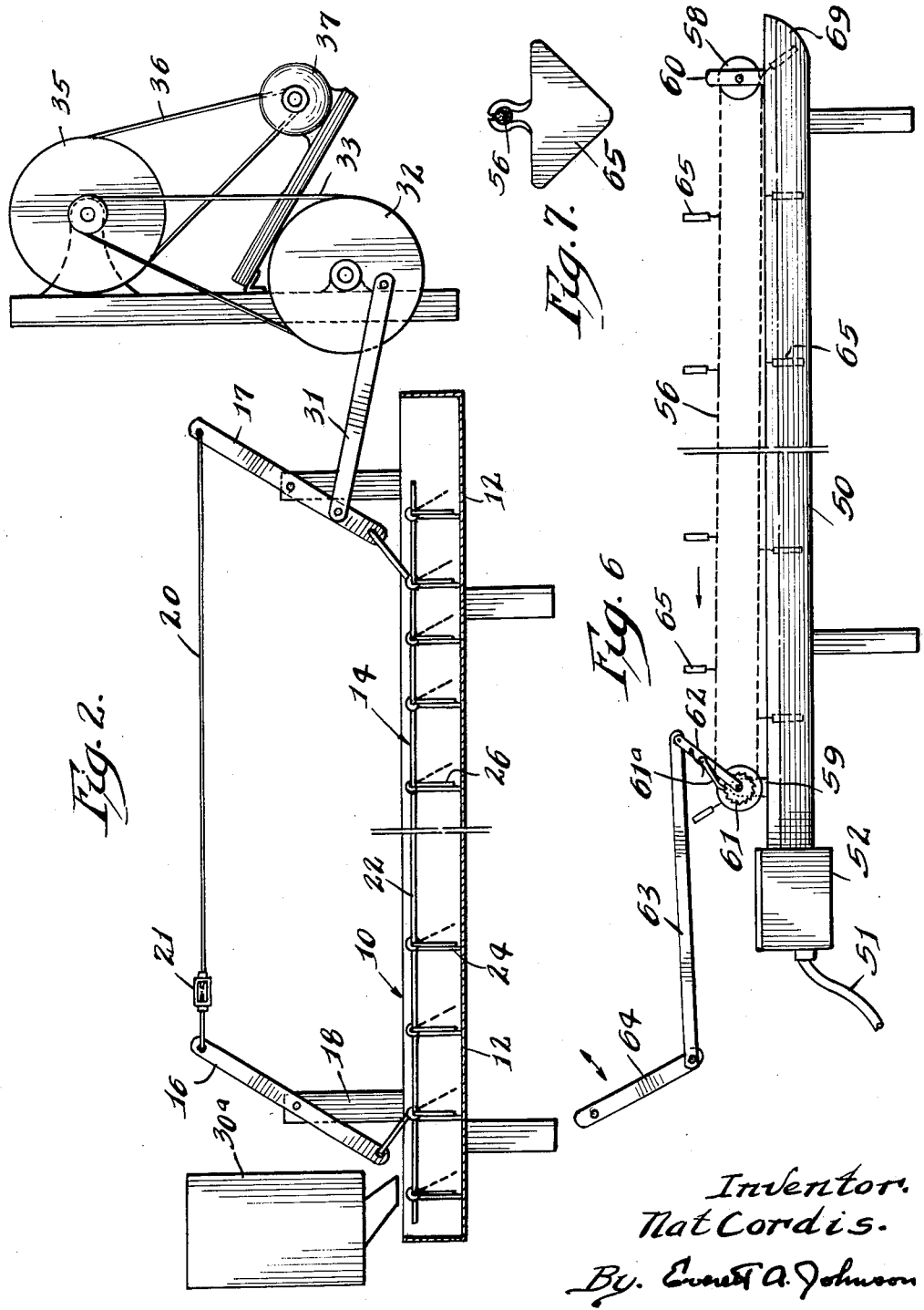

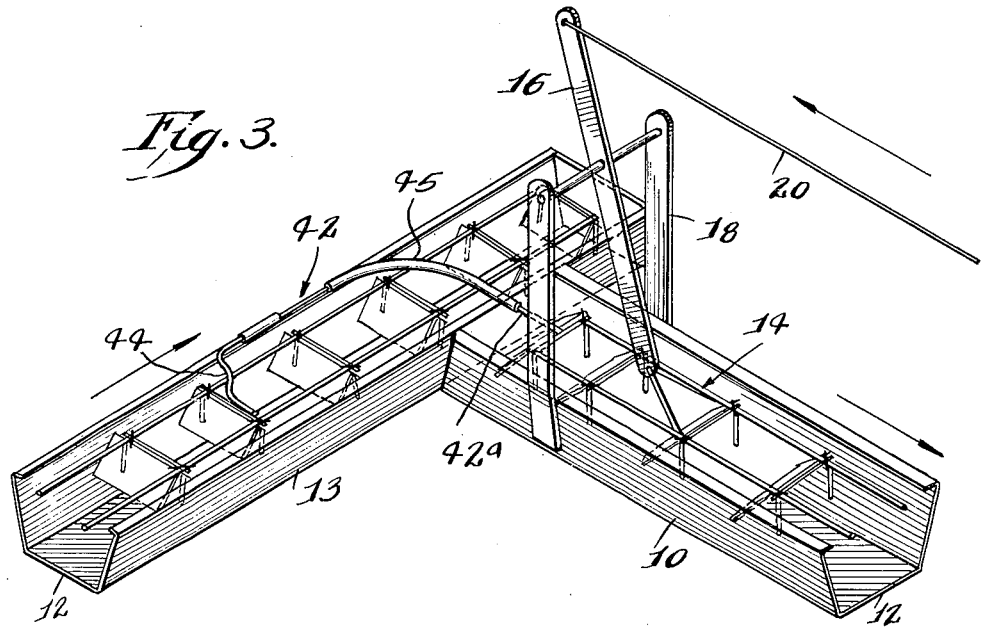
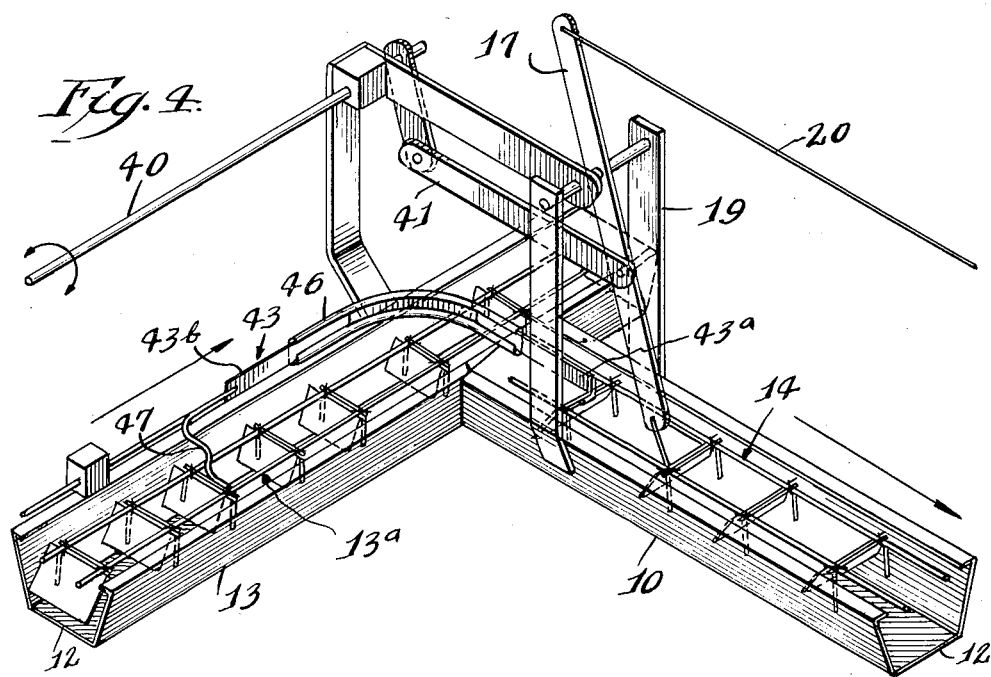

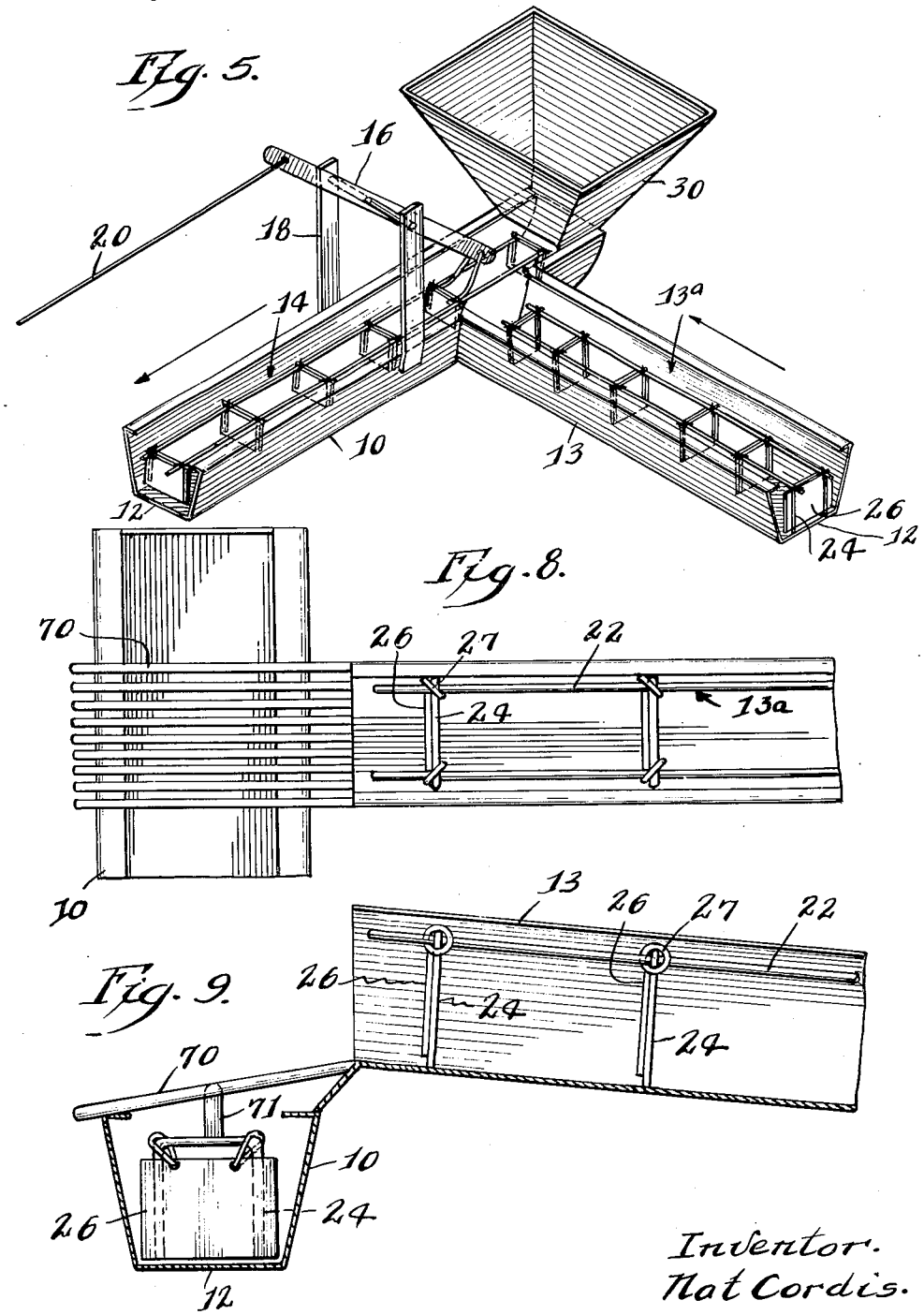

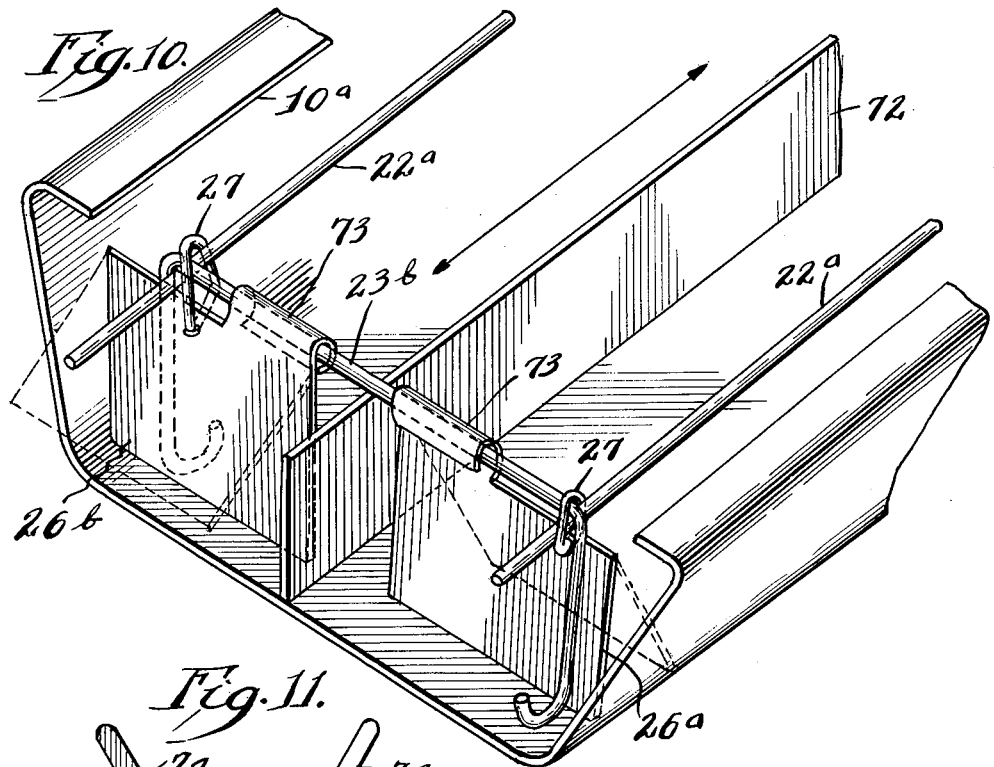
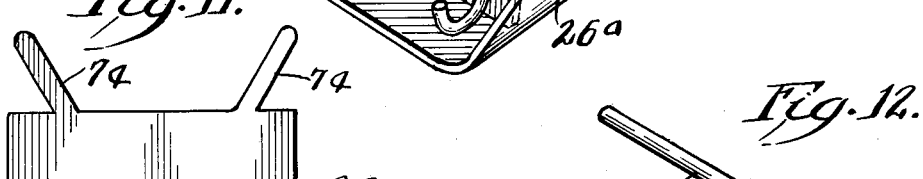
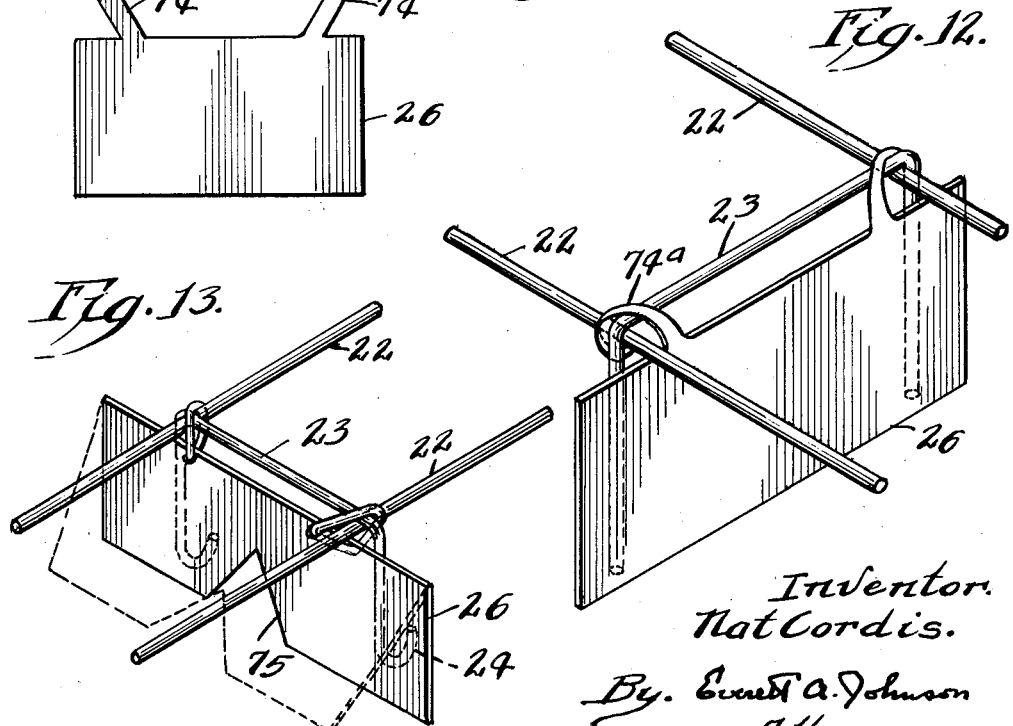

3,057,329
CONTINUOUS PADDLE TYPE FEEDER
Nat Cordis, Crown Stock Farms, Silver Lake, Wis.
Filed July 31, 1958, Ser. No. 752,213
7 Claims. (Cl. 119—51.5)

This invention relates to improvements in animal husbandry and, more particularly, to poultry feeding and watering devices.

The care of livestock such as poultry necessarily involves much manual attention with respect to the feeding and watering, and this invention is directed to a feeding device for distributing pulverant materials along an open-topped trough accessible to stock. It is also directed to poultry waterers of the trough type wherein a source of water is maintained at a predetermined level.

In use, a considerable quantity of litter may collect within the waterer some of which is deposited on the bottom thereof, some of which floats on the water, and some of which tends to adhere to the sides of the trough when the water level is lowered. Since it is desirable to have clean water, this refuse must be moved at frequent intervals. In addition to avoiding accumulations of this sort, it is desirable to move the water within the trough since moving water attracts the birds and they drink more water which is beneficial.

With respect to the feeders, it is desirable to provide a feeder of large capacity, a feeder which distributes the supply uniformly, and a feeder which is of simple sturdy construction requiring minimum maintenance.

It is therefore an important object of this invention to provide apparatus useful in the care of poultry which includes a feeder of large capacity in which the feeding can be controlled with a minimum of attention by an operator, and which includes a self-cleaning watering trough. Another object is to provide a system which is automatic and which includes a conveyor mechanism which is quiet running and is adapted to handle various types of feed. Another object is to provide an apparatus wherein the self-cleaning watering trough is positive in its action. A more specific object is to provide a combination apparatus wherein the means for driving the watering trough cleaner is provided by the automatic poultry feeder.

Another important object of the invention is to provide a poultry feeder comprising an endless trough circuit containing a paddle type assembly adapted to move feed in a continuous circuit and to move feed in more than one direction. These and other objects of my invention will become apparent to those skilled in the art as the description thereof proceeds.

Briefly, according to my invention I attain the objects thereof by providing an open-topped trough for delivering feed, and a separate open-topped trough for maintaining a water supply adjacent thereto. Within the feeder I have an operating member oscillated therein, such member comprising a plurality of evenly spaced blades which are pivotally carried by the member. The blades assume a generally vertical position during a pushing or feeding stroke, and on the return stroke of the member the blades swing rearwardly and are returned over the advanced feed in the trough. The length of the stroke in each direction is greater than the distances between the blades. The operating member comprising a trapezoidal frame including a pair of end levers, a flexible lattice pivotally fixed to the lower ends of the operating levers and a tie-wire extending adjustably between the upper ends of the operating levers. The blades are suspended from the under side of the operating member or lattice; cross wires of the lattice have their outer ends turned downwardly to form supporting legs, and against which the blades swing in assuming the vertical feed advancing position.

At the corners, i.e. where non-linear straight trough sections merge, I provide means for transmitting the oscillating motion to a second operating member of similar construction to that just described. Two such motion transmitting corners are provided in the circuit, each circuit including a pair of opposed linear operating members and a pair of cross-over operating members. A single drive in a third corner actuates the two linear operating members directly. A feed hopper is provided at the fourth corner and may be in alignment with the end of the second linear operating member. An extension of the operating member projects below the hopper on alternate strokes and a paddle thereon impels the feed from the hopper into the trough circuit.

A water trough cleaner means includes an endless flexible conveyor traveling over spaced pulleys and is adapted to travel along the waterer and carries paddles which extend into the trough. The paddles conform to the cross-sectional shape of the watering trough and travel on an endless conveyor driven by the drive means for the feeder. Thus the oscillating motion of the feeder may be converted to the continuous linear motion of the endless paddle-conveyor in the watering trough. This may be done by power take-off such as a ratchet drive on one of the pulleys, and such as a star wheel drive actuated by one of the operating members through a universal shaft to one of said pulleys.

Further details and advantages of my apparatus will be described by reference to preferred embodiments thereof illustrated in the drawings and wherein:

FIGURE 1 is a schematic plan view of my feeder and water apparatus;

FIGURE 2 is an elevation taken along the line 2—2 in FIGURE 1;

FIGURE 3 is a perspective taken along the line 3—3 in FIGURE 1 showing one embodiment of the motion transmitting corner;

FIGURE 4 is a perspective taken along the line 4—4 in FIGURE 1 and illustrates another embodiment of a motion transmitting corner and details of the drive transmission;

FIGURE 5 is a perspective taken along the line 5—5 in FIGURE 1 showing details of the feed hopper corner;

FIGURE 6 is an elevation taken along the line 6—6 in FIGURE 1;

FIGURE 7 is a view of a paddle on the apparatus of FIGURE 6;

FIGURES 8 and 9 are views showing a litter remover in the trough circuit;

FIGURE 10 is an enlarged view of another embodiment of the operating member assembly wherein the feed is conveyed in two directions within a single trough;

FIGURES 11 and 12 illustrate another form of paddle having an integral hook for support; and FIGURE 13 illustrates a blade form which may be used in the apparatus of FIGURES 1 and 10 to provide a central mass of feed adapted for use with turkeys.

Referring to the drawings, a feeding trough 10 having side walls 11 and floor 12 is arranged in a continuous circuit with cross-over troughs 13, as shown in FIGURE 1.

A feeding track or operating lattice assembly 14 is arranged within the troughs 10 and 13, each assembly including blades 26. A power unit 15 disposed at one corner of the trough circuit is linked to the operating lattice assembly 14 in trough 10, and oscillates the assembly with its blades 26 therein to deliver feed throughout the circuit.

The motion or drive imparted to the assembly 14 is by way of a trapezoidal linkage comprising a pair of operating levers 16 and 17 at opposite ends of a length of trough 10. Operating lever 16 is pivotally supported by the lever support 18 astride the troughs 10 and including the pivot rod 18a. Operating lever 17 in turn is supported by lever support 19 astride the other end of a trough 10 and being provided with pivot rod 19a.

The lower ends of the operating levers 16 and 17 are pivotally linked to the operating lattice 14 by means of linkages 16b and 17b, respectively. The upper ends of the levers 16 and 17 are connected by overhead bracing wire or cable 20 which is provided with turnbuckle 21 for adjustment of tension in the cable 20, and hence the tension of the flexible lattice 14.

The operating lattice assembly 14 includes the parallel wires 22 which run the full length of each operating assembly 14. At spaced intervals, corresponding to less then the length of the stroke of the feed track assembly 14, are a plurality of cross-wires 23 having their end portions bent downwardly to provide legs 24 depending from the parallel wires 22. The legs 24 may be provided with feet 25 which may comprise upturned end portions thereof, as shown in FIGURES 10 and 13, or may be separable plastic caps, as shown in FIGURE 2.

The cross-over troughs 13 include operating assemblies 13a which are of construction similar to the feed track units 14 but are driven through the mechanisms illustrated in FIGURES 3 and 4, to be described later.

The blades 26 are suspended from the assembly 14 (as well as assemblies 13a) by means of rings 27 which pass over the junction of the wires 22 with the cross-over wires 23 and through the holes 26a. An extension 14a (see FIGURES 1 and 5) of the assembly 14 in trough 10 carries a hinged paddle 28 which operates within the hopper 30 and from which feed is supplied to the circuit.

Referring to FIGURES 1 and 2, the reciprocating power unit 15 is connected to the operating levers 17 by connecting rod 31. Reciprocating drive motion is applied to the connecting rod 31 by drive wheel 32, which in turn is driven by drive wheel belt 33 running over drive pulley 34. The drive pulley 34 is fixed to drive shaft 34a rotated by transmission pulley 35. Transmission belt 36 driven by motor 37 runs over transmission pulley 35 in a conventional manner. If desired, the motor 37 may be controlled by a timer mechanism 37a. Likewise, means may be provided comprising a conventional feed responsive switch (not shown) for over-riding the timer mechanism 37a in the event the quantity of feed in the trough 10 varies beyond a preselected quantity range.

As shown in FIGURE 2 of the drawings, the operating assembly 14 is moving feed from left to right, with the blades 26 being back-stopped by the depending legs 24. However, when the assembly 14 is moved from right to left in the return stroke, the blades 26 assume the dotted position shown in FIGURE 2.

Feed is delivered through the trough circuit by the conveyor assembly 14 as it is reciprocated by the power unit 15 and the blades 26 advance the feed an increment of the total length of the trough circuit, for example, a distance of between 5 and 10 inches, which is greater than the spacing of the cross-wires 22 and the blades 26 in the operating lattice 14 and in the cross-over feed drive assembly 13a. The direction of movement of the operating assembly 14 is cyclically reversed by the power unit 15 and simultaneously the cross-over feed delivery units 13a are reversed. The oscillating motion is imparted to the linked assemblies 14 and 13a by means of the corner drive transmissions, shown in FIGURES 3 and 4.

Upon the return stroke of the operating assembly 14, the blades 26 lift at their lower edges, as above described, and ride over the already advanced feed. The length of the stroke of the operating assembly 14 is greater than the spacing between the hinged blades 26 and may, for example, be a stroke of between 6 and 11 inches when the blades 26 are from about 5 to 10 inches apart. In a typical installation, the blades are about 6 inches apart and the stroke is about 7 inches long. The reciprocating cycle is repeated at a rate of from 15 to 50 strokes per minute.

By the arrangement shown in FIGURES 1 and 4, the two parallel operating assemblies 14 in the troughs 10 are simultaneously but oppositely moved through the drive shaft 40 and the associated linkages 41.

The cross-over conveyor assemblies 13a are driven to-and-fro within the cross-over troughs 13 through the flexible drives 42 and 43 shown in detail by FIGURES 3 and 4. In FIGURE 3, the flexible drive 42 comprises a cable operating within the tubing 45 and having one end 42a fixed to the operating assembly 14 and the other end 42b fixed to a hold-down 44 engaging a mid-portion of the cross-over operating assembly 13a. In FIGURE 4, the flexible drive 43 is a flat band operating within the channel 46. One end 43a of the band 43 is fixed to the operating unit 14 and the other end 43b is fixed to the hold-down 47 secured to the cross-over assembly 13a as shown.

By the arrangement of the trapezoidal linkage, including the operating levers 16 and 17, the overhead bracing member 20, the rigid links 16b and 17b, and the flexible lattice wires 22, the flexible parallel operating assemblies 14 are drawin to-and-fro without any buckling and substantially all portions thereof remain within the troughs 10. The cross-over feed conveyors 13a may be relatively short and are held within the cross-over troughs 13 by the hold-downs 44 and 47.

Reverting to FIGURES 1 and 6, the waterer includes a trough 50, water inlet line 51, float chamber 52, and valve 53 controlling the flow of water from inlet 51 into chamber 52. The water supply by inlet line 51 accumulates in chamber 52 and in trough 50 until the predetermined depth of water is reached, the water flowing into trough 50 via a port in a wall of chamber 52.

The cleaner 55 for the trough 50 includes a flexible conveyor 56 which may be an endless cable or chain trained about pulleys 57 and 58 suported by brackets 59 and 60. A ratchet gear 61 is arranged to drive the pulley 57 in one direction only through the action of the pawl 61a thereon. The pawl 61a is carried by the linkage 62 which is driven by the oscillating drive bar 63, which in turn is driven by the cam lever 64 carried by the oscillating drive shaft 40.

In addition to the conveyor 56, the cleaner 55 includes the spaced paddles 65 illustrated in FIGURE 7 as conforming to the cross-sectional pattern of the trough 50. The paddles 65 discharge at the terminal end 68 of the trough 50 which includes the upwardly inclined ramp 69 having the cross-sectional configuration of the paddles carried by the conveyor 56. The contour of the ramp 69 corresponds to a curve having its radius at the turning axle of the pulley 58 mounted on the trough 50.

In some instances it may be desirable to include one or more paddles 65 which comprise flexible scraper blades adapted to conform to the shape of the trough 50 when passing therethrough. Such scraper blade paddles (not shown) may replace one or more of the paddles 65.

With this arrangement of combined feeder and watering troughs, each having paddle or blade type conveyors therein, the watterer may be kept clean automatically. A single drive means 15 can thereby be used to perform two useful functions, and an economical unit for poultry care is provided.

In FIGURES 8 and 9, I have illustrated a means for removing litter from the feed being conveyed in the circuit. This includes a grating 70 which is vibrated by the pin 71 carried by the operating assembly 14. The feed from cross-over trough 13a is discharged into the trough 10 and the litter moves down the grating 70 to a point beyond the edge of the trough 10. In some instances it is desirable to convey in two directions within a single trough, and such an assembly is illustrated by FIGURE 10. This includes a trough 10a having a partition or divider 72 with two blades 26a and 26b supported by cross-wires 23b on the lattice wires 22a. The blades 26a and 26b are suspended on opposite sides of the legs 24a and are suported by rings 27 and integral hinge members 73. This modified blade assembly may be substituted for that of the operating assembly 14 in a straight line trough to provide a complete circuit within a single trough.

The blades 26 and the various embodiments of the invention are preferably of light plate stock being relatively thin and light so as to readily lift over the advanced feed on the return stroke as described. They may be of wood, plastic or metal, with metal being preferred. The parallel members 22 and 22a and the cross-wires 23 and 23a are preferably of flexible wire such as frequently used in certain types of fencing. The troughs 10, 13 and 10a may be formed from metal sheet, molded plastic and the like, but other constructions such as fabrication from boards and the like will be apparent to those skilled in the art, in view of the teachings herein.

With respect to FIGURES 3 and 4, these corner assemblies have been described with reference to my flexible feed conveying units 14 and 13a. However, it is contemplated that rigid operating rods with depending hinged paddles may be substituted for the assemblies 13a and 14, and that my corner constructions with the flexible transmision members 42 and 43 and the overlapping merging trough sections as illustrated may be used therewith.

In addition to the paddle constructions already described, other forms are described in FIGURES 11 and 13. In FIGURES 11 and 12 the supports for the paddles 26 comprise integral straps 74 which are bent to form hooks 74a over the cross-wires 23 and the lattice wires 22, as shown in FIGURE 12.

For use in turkey feeders it may be desirable to provide a relatively deep mass of feed along a trough, and in FIGURE 13 I provide notch 75 in blade 26. When the assembly is oscillated as described, the feed is ploughed forward and inward of the trough to accumulate the relatively deep mass of feed along the center thereof.

Although my apparatus has been described in terms of particular embodiments thereof which have been set forth in considerable detail, it should be understood that these are by way of illustration only and that my invention is not necessarily limited thereto. Alternative constructions and operating techniques will become apparent to those skilled in the art in view of my disclosure, and accordingly, it is contemplated that modifications can be made without departing from the spirit of the described invention.

What I claim is:

1. A stock feeder comprising a pair of substantially parallel trough sections, a pair of cross-over trough sections traversing the ends of said parallel sections, said parallel sections being arranged alternately with said cross-over sections, an array of suspended paddles in each of said sections, adjacent pairs of arrays in adjacent trough sections being mechanically linked by a flexible drive means, said flexible drive means being connected to the end of the array in said parallel trough section and terminating in a hold down fixed to an intermediate point of the array cross-over section, anchor means for holding said flexible drive means relative to said trough sections, and means for reciprocating said adjacent pairs of arrays in unison whereby feed is advanced within a closed circuit including said sections.

2. A continuous paddle type feeder including an endless trough circuit, a plurality of arrays of blades operating in said circuit and adapted to move feed unidirectionally within said circuit, each of said arrays including a first operating assembly supporting a plurality of hinged blades, and a first cross-over operating assembly arranged transverse to said first operating assembly, and flexible tension linkage means across the ends of a first operating assembly, a second linkage between the end of said first assembly and a mid-point of said cross-over assembly for operating said first and second assemblies in unison, said second linkage terminating in a hold down for said cross over assembly.

3. The feeder of claim 2 which includes a waterer comprising an open-topped trough, and an endless unidirectional cleaner means adapted to travel along the bottom of said trough, and mechanical motion transmitting means linking said feeder with said cleaner whereby the continuous motion of the feeder moves the cleaner.

4. A conveyor system for flowable pulverant materials comprising in combination a trough means, said trough means including a plurality of linear sections, a material delivery means operating within said trough means and being reciprocated longitudinally within said sections, said material delivery means including a plurality of hinged paddles extending transverse of said trough and in longitudinally spaced relation to each other along said trough, means supporting said paddles to permit their free swing in one direction and restricted swing in the other direction, said last named means supporting said material delivery means within said trough sections, means for reciprocating said material delivery means in a feed delivering stroke and a return stroke, arrays of said paddles being substantially coextensive with each said section, and flexible linkage means connected between an end of one array and an intermediate point of another array for transmitting the movement of one array to that of another in an adjacent section, said flexible linkage comprising a hold-down for the array in the adjacent section.

5. The system of claim 2 wherein said cleaner means includes an endless flexible element, pulley means adjacent the ends of said watering trough over which said element is caused to travel, and drag means carried by said element and travelling within said trough means to eject litter therefrom as the drag means emerges from the end of the trough.

6. The feeder apparatus of claim 2 wherein an array in such circuit includes pairs of hinged blades suspended to swing in opposition so as to provide two-way travel of feed in a trough section.

7. The feeder apparatus of claim 2 which includes the improved blade having a bottom notch whereby feed is plowed forward and inward of the trough to accumulate a relatively deep mass of feed along the trough.

References Cited in the file of this patent

UNITED STATES PATENTS

| | | |
|---|---|---|
| 2,043,595 | Raymond | June 9, 1936 |
| 2,522,449 | Inman | Sept. 12, 1950 |
| 2,681,132 | Knutson | June 15, 1954 |
| 2,714,950 | Rubin | Aug. 9, 1955 |
| 2,719,509 | Kitson | Oct. 4, 1955 |
| 2,821,961 | Mercoli | Feb. 4, 1958 |
| 2,841,115 | Weber | July 1, 1958 |
| 2,907,445 | Jones | Oct. 6, 1959 |
| 2,960,965 | Cordis | Nov. 22, 1960 |